United States Patent [19]
Neumann et al.

[11] Patent Number: 5,313,213
[45] Date of Patent: May 17, 1994

[54] DEVICE FOR ALIGNING A DIRECTIONAL ANTENNA OF A RADAR DISTANCE WARNING DEVICE OF A VEHICLE

[75] Inventors: Frank Neumann; Dieter Hotz, both of Stuttgart, Fed. Rep. of Germany

[73] Assignee: Mercedes-Benz AG, Fed. Rep. of Germany

[21] Appl. No.: 2,848

[22] Filed: Jan. 15, 1993

[30] Foreign Application Priority Data

Jan. 18, 1992 [DE] Fed. Rep. of Germany ....... 4201214

[51] Int. Cl.⁵ .............................................. G01S 7/40
[52] U.S. Cl. ................................... 342/165; 343/711; 343/721
[58] Field of Search ............... 342/165, 70; 343/721, 343/711, 713, 714

[56] References Cited

U.S. PATENT DOCUMENTS 2,479,565  8/1949  Grossman .......................... 342/165
3,683,379  8/1972  Saddler et al. ..................... 343/714
3,794,997  2/1974  Iwatsuki et al. .

FOREIGN PATENT DOCUMENTS 281926   6/1970  Australia .
3406867  10/1984  Fed. Rep. of Germany .

Primary Examiner—Mark Hellner
Attorney, Agent, or Firm—Evenson, McKeown, Edwards & Lenahan

[57] ABSTRACT

A device for aligning a directional antenna of a radar distance warning device of a vehicle has an alignment spotlight connected to the directional antenna to form a rigid unit adjustably mounted on the vehicle via an adjusting board. This rigid unit is aligned by aligning the optical axis of the light cone of the alignment spotlight with the aid of a vehicle-related optical verification device, particularly a headlight adjusting device. The alignment spotlight can be removable, or the vehicle headlight can be used for alignment.

11 Claims, 2 Drawing Sheets

DEVICE FOR ALIGNING A DIRECTIONAL ANTENNA OF A RADAR DISTANCE WARNING DEVICE OF A VEHICLE

BACKGROUND AND SUMMARY OF THE INVENTION

The present invention relates to a device for aligning a directional antenna of a radar distance warning device of a vehicle.

In a radar distance warning device, a directional antenna both sends out a radar beam and receives the reflection signal from any obstacle. The reflection signal is evaluated in a computer and the distance from the obstacle is indicated to the driver in a suitable manner. To obtain reliable operation, it is necessary that the radar beam sent out always has a particular angle to the roadway, both in the vertical and in the longitudinal direction, since otherwise a bridge, for example, would be identified by the computer as an obstacle. Thus, an alignment device is necessary by which the directional antenna can be adjusted in the directions described above and set to the correct inclination.

German Patent Document DE 34 06 867 A1 shows an optically alignable directional antenna for receiving satellite transmissions which can be aimed at the satellite by optically finding the satellite with the aid of a telescope connected to the directional antenna.

Radar distance warning devices have to present usually been aligned with the aid of a commercially available microwave measuring instrument which verifies the beam sent out by the directional antenna. This measuring instrument is expensive, complex, difficult to operate and has hitherto not been part of the normal equipment of a workshop.

An object of the present invention is to provide a generic device in such a manner that the alignment is carried out in an inexpensive, fast and simple manner.

This and other objects are achieved by the present invention which provides a device for aligning a directional antenna of a radar distance warning device of a vehicle comprising an alignment spotlight having a light cone with an optical axis and an adjusting board. This adjusting board is coupled to the alignment spotlight and to the directional antenna to form a rigid unit that is adjustably mounted on the vehicle. The rigid unit is alignable by aligning the optical axis of the light cone of the alignment spotlight using a vehicle-related optical verification device.

As an advantage compared with the earlier mentioned German Patent Document, the device according to the invention uses proven and widely used, but technologically unsophisticated techniques.

Certain embodiments of the invention provide a removable alignment spotlight which can be removed after conclusion of the alignment. In certain embodiments, an additional alignment spotlight is omitted and the directional antenna can be aligned together with a main headlight of the vehicle.

Other objects, advantages and novel features of the present invention will become apparent from the following detailed description of the invention when considered in conjunction with the accompanying drawings.

DETAILED DESCRIPTION OF THE DRAWINGS

Figure 1:
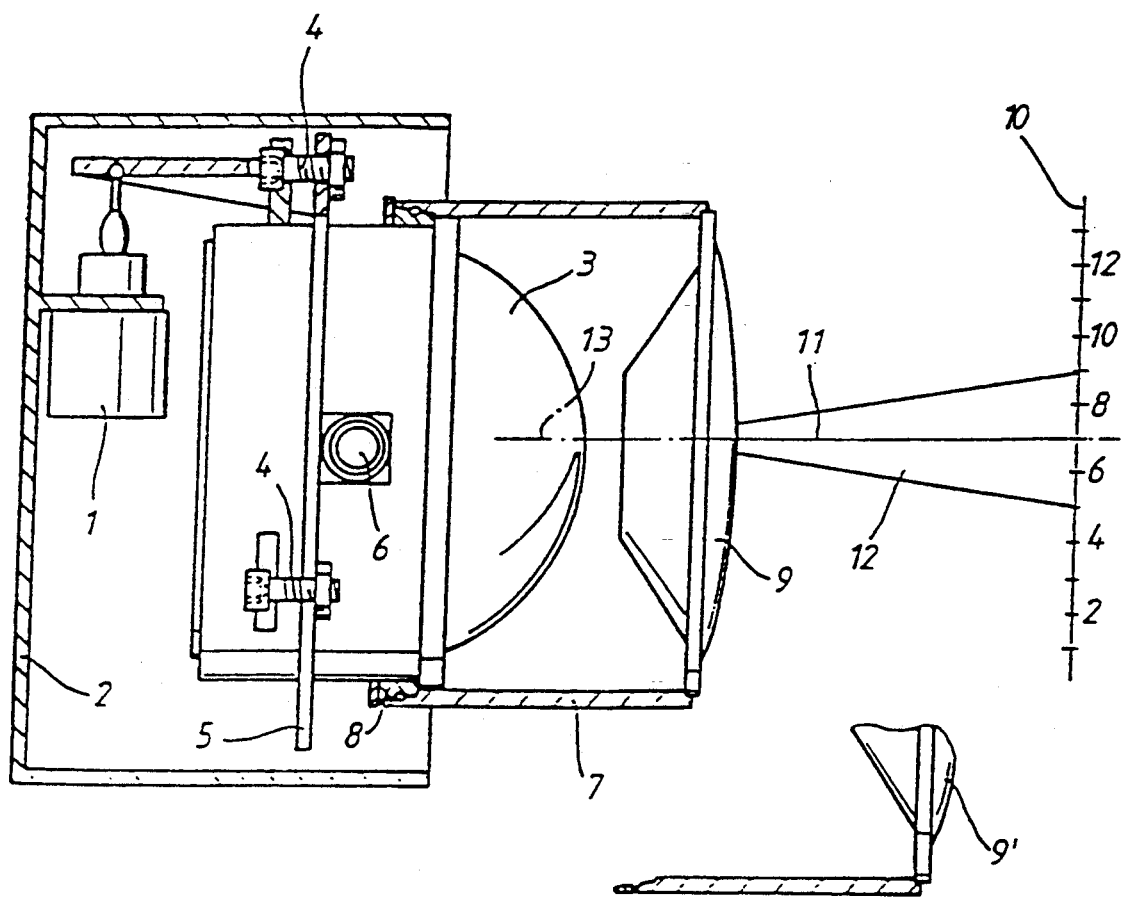
FIG. 1 shows a first illustrative embodiment of the device according to the invention.

A first illustrative embodiment of the alignment device of the present invention is explained with reference to FIG. 1. The directional antenna 3 of a radar distance warning device is connected via a rotating axle 6 to a vehicle-fixed housing 2 which is also used for accommodating an optional adjusting motor 1. In this embodiment, alignment only in the vertical direction is provided which can be effected by means of an adjusting board 5 both via adjusting screws 4 and also via the adjusting motor 1. One skilled in the art can extend this to provide a holder which provides for adjustability in two or even in all three directions. The directional antenna 3 is connected to an alignment spotlight 9 via a link 7 (for example a tube). The link 7 is fixed to the rear of the alignment spotlight 9 and is mounted at the antenna end by means of a detachable lock. For this purpose, a corresponding receptacle is provided which, on the one hand, offers accurately-fitting, firm attachment and, on the other hand, provides for fast removal (item 9'). The receptacle can be constructed as a screw, bayonet or, as shown, a snap-in closure 8.

To align the directional antenna, the vehicle is moved to an adjusting station comprising a vehicle-related, optical verification device 10. A suitable verification device is adjusting marks on a display screen or, in a preferred embodiment, a headlight adjusting device which directly measures the alignment of the optical axis with respect to the vehicle axes. The alignment spotlight 9 is then pushed over the directional antenna 3 until the snap-in closure 8 is firmly latched. Then the alignment spotlight 9 is switched on and the position of the optical axis 11 of the light cone 12 impinging on the verification device 10 is determined and compared with a predetermined, vehicle-related nominal value. Assuming that the nominal value is, for example, seven scale units on the verification device 10, the adjustment is already optimum as shown in FIG. 1. The optical verification device 10 at the same time indicates the position of the main radiating direction 13 of the directional antenna 3 if the main radiating direction 13 coincides with the optical axis 11 of the alignment spotlight 9 as in the illustrative embodiment of FIG. 1. If the position of the optical axis 11 of the light cone deviates from the nominal value, the alignment spotlight 9 is rotated jointly with the directional antenna 3 around the common axis 6 by rotating the adjusting screws 4 or, if present, by operating the adjusting motor 1, until the nominal value has been reached on the scale of the verification device 10. Due to the accurately-fitting coupling between the direction antenna and the alignment spotlight 9, its adjustment to the nominal value produces a defined and reproducible alignment of the directional antenna 3. The adjusting process is ended by removing the alignment spotlight 9 from the directional antenna 3 so that the microwaves radiated by the directional antenna can propagate unimpeded.

Figure 2:
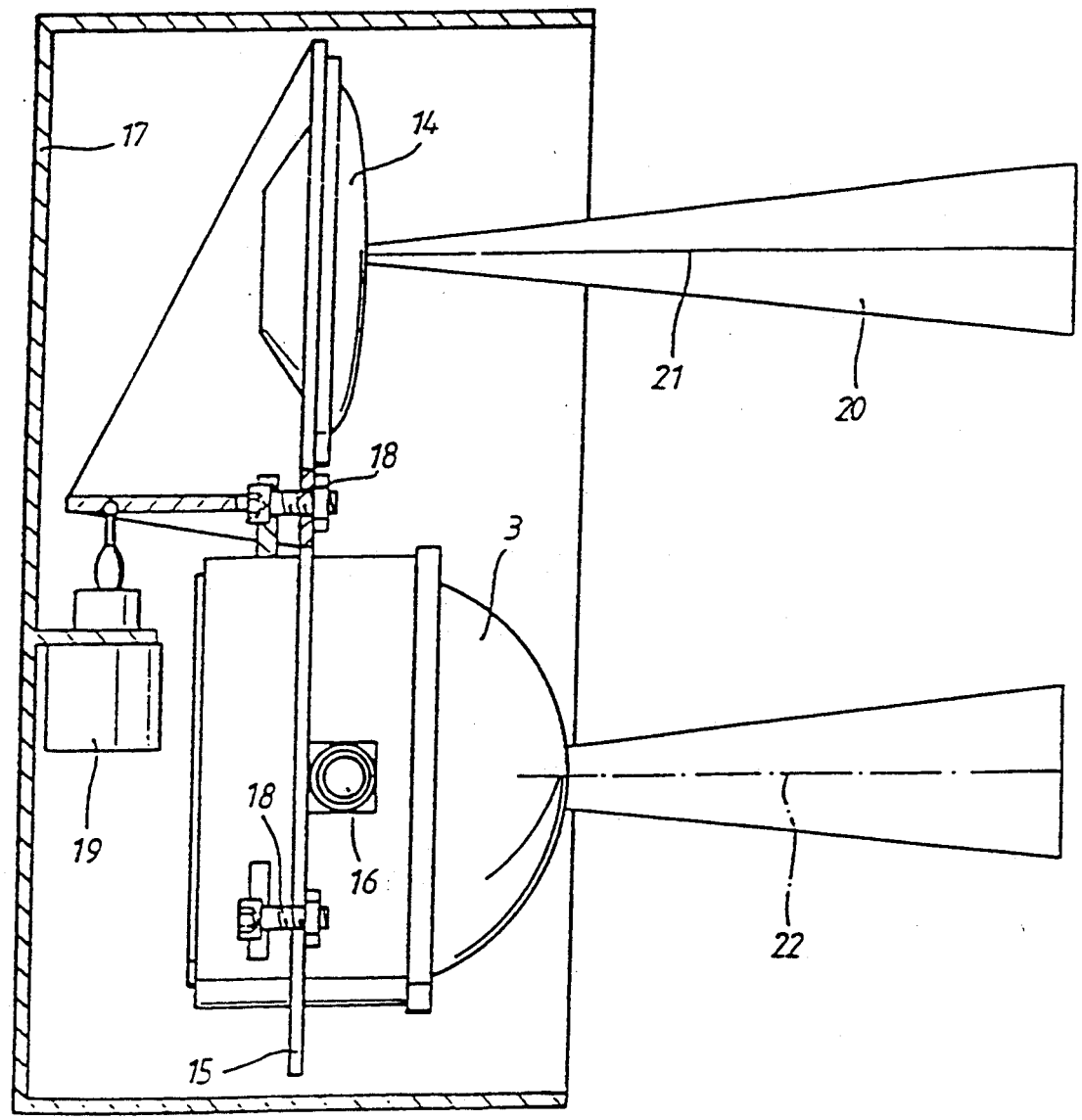
FIG. 2 shows a second illustrative embodiment of the device according to the invention.

FIG. 2 shows a second illustrative embodiment in which the directional antenna 3 is mounted in a defined manner in the immediate vicinity of a vehicle headlight 14 on a common adjusting board 15. In this embodiment, the additional alignment is omitted since its function is taken over by the vehicle headlight 14 as a result of which the alignment of the directional antenna can be carried out in one work cycle with the alignment of the vehicle headlight. The adjusting board 15 is connected via a rotating axle 16 to a vehicle-fixed housing 17 which is also used for accommodating an optical adjusting motor 19. Again, an alignment only in the vertical direction is provided in this illustrative embodiment, which can be effected by means of the adjusting board 15 both via adjusting screws 18 and via the adjusting motor 19. One of ordinary skill in the art can extend this to provide a holder which provides for adjustability in two or even in all three directions.

To align the directional antenna, the vehicle is moved as in the first illustrative embodiment to an adjusting station comprising a vehicle-related optical verification device, which has not been shown again in FIG. 2. Since the alignment is effected via the light cone 20 of the vehicle headlight 14, a headlight adjusting device can be used. This is used to set the vehicle headlight 14 as normal in accordance with defined specifications in that the adjusting board 15 is rotated by rotating the adjusting screws 18 or, if present, by operating the adjusting motor 19, around the vehicle-fixed rotating axle 16 until a nominal value has been reached on the scale of the verification device. Due to the accurately-fitting installation of the directional antenna 3 and the vehicle headlight 14 on the common adjusting board 15, the alignment of the vehicle headlight 14 produces a defined and reproducible alignment of the directional antenna. If it has been assured by constructional measures during the installation as in the illustrative embodiment of FIG. 2 that the optical axis 21 of the light cone 20 of the vehicle headlight and the main radiating direction 22 of the directional antenna are aligned parallel to one another, the aligned light cone 20, or more accurately its optical axis 21, indicates the main radiating direction 22 (with parallel offset).

Although the device was described for a radar distance warning device, the subject-matter of the invention can naturally also be used in ultrasonic or infrared distance warning devices.

Although the invention has been described and illustrated in detail, it is to be clearly understood that the same is by way of illustration and example, and is not to be taken by way of limitation. The spirit and scope of the present invention are to be limited only by the terms of the appended claims.

What is claimed is:

1. Device for aligning a directional antenna of a radar distance warning device of a vehicle, comprising:
    an alignment spotlight separate and distinct from the directional antenna, having a light cone with an optical axis; and
    an adjusting board coupled to the alignment spotlight and to the directional antenna to form a rigid unit that is adjustably mounted on the vehicle, wherein the rigid unit is alignable by aligning the optical axis of the light cone of the alignment spotlight using a vehicle-related optical verification device.

2. Device according to claim 1, further comprising an accurately-fitting, detachable connection that connects the directional antenna and the alignment spotlight together.

3. Device according to claim 1, wherein the alignment spotlight is a vehicle headlight.

4. Device according to claim 2, wherein the optical axis of the alignment spotlight coincides with a main radiating direction of the directional antenna.

5. Device according to claim 3, wherein the optical axis of the alignment spotlight is aligned parallel to a main radiating direction of the directional antenna.

6. Device according to claim 1, further comprising adjusting screws which provide for aligning the rigid unit.

7. Device according to claim 1, wherein the adjusting board is mounted adjustably about an axis parallel to a transverse vehicle axis on the vehicle.

8. Device according to claim 1, wherein the adjusting board is mounted adjustably about an axis parallel to a transverse vehicle axis and about an axis parallel to a vertical vehicle axis on the vehicle.

9. Device according to claim 1, wherein the optical axis of the alignment spotlight coincides with a main radiating direction of the directional antenna.

10. Device according to claim 1, wherein the optical axis of the alignment spotlight is aligned parallel to a main radiating direction of the directional antenna.

11. Device according to claim 1, further comprising an adjusting motor which provides for aligning the rigid unit.

* * * * *